US012567425B2

(12) United States Patent
Pan et al.

(10) Patent No.: US 12,567,425 B2
(45) Date of Patent: Mar. 3, 2026

(54) ENCODING METHOD AND DECODING METHOD

(71) Applicant: HTC Corporation, Taoyuan City (TW)

(72) Inventors: Kuan Nien Pan, Taoyuan City (TW); I Yun Su, Taoyuan City (TW); Yan-Min Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 287 days.

(21) Appl. No.: 18/324,175

(22) Filed: May 26, 2023

(65) Prior Publication Data

US 2024/0395265 A1 Nov. 28, 2024

(51) Int. Cl.

| | |
|---|---|
| ***G10L 19/018*** | (2013.01) |
| ***G10L 19/008*** | (2013.01) |
| ***G10L 19/032*** | (2013.01) |
| ***G10L 25/21*** | (2013.01) |

(52) U.S. Cl.

CPC .......... *G10L 19/018* (2013.01); *G10L 19/008* (2013.01); *G10L 19/032* (2013.01); *G10L 25/21* (2013.01)

(58) Field of Classification Search

CPC ... G10L 19/018; G10L 19/008; G10L 19/032; G10L 25/21

See application file for complete search history.

(56) References Cited

U.S. PATENT DOCUMENTS

| | | | | |
|---|---|---|---|---|
| 6,901,514 B1 * | 5/2005 | Iu | H04N 1/32154 380/252 |
| 12,249,344 B1 * | 3/2025 | Evans | G10L 15/08 |
| 2014/0254801 A1 * | 9/2014 | Srinivasan | G10L 19/008 381/17 |
| 2015/0228045 A1 * | 8/2015 | Mehta | G06T 1/0064 382/103 |
| 2016/0260321 A1 * | 9/2016 | Hsieh | H03J 9/04 |
| 2022/0046141 A1 | 2/2022 | Wu et al. | |

FOREIGN PATENT DOCUMENTS

| | | |
|---|---|---|
| TW | 468344 | 12/2001 |
| TW | 200607361 | 2/2006 |
| TW | I790682 | 1/2023 |

* cited by examiner

*Primary Examiner* — Joseph L Greene
(74) *Attorney, Agent, or Firm* — JCIPRNET

(57) ABSTRACT

An encoding method for embedding a watermark into an audio is provided. A text watermark and an original audio are obtained. The text watermark is converted to an image watermark. The original audio is converted from a time domain to a frequency domain to generate a pre-process audio. The image watermark is embedded into the pre-processed audio to generate an encoded audio. The encoded audio is converted from the frequency domain to the time domain to generate an watermarked audio.

18 Claims, 6 Drawing Sheets

ENCODING METHOD AND DECODING METHOD

BACKGROUND

Technical Field

The disclosure relates to an encoding method; particularly, the disclosure relates to an encoding method and a decoding method.

Description of Related Art

Due to the advancement of technology, the information spreads quite rapidly, so how to protect intellectual property rights is now becoming an important issue. Signatures, watermarks, or trademarks are often used to help identify the ownership of intellectual property rights. However, in the field of audio, it is relatively difficult to prove that a certain sound effect or a certain piece of an audio is created by someone or belongs to someone. In order to solve the above problems, the digital watermark hidden in the audio can be used as evidence to find out the creator or the owner of the certain sound effect or the certain piece of the audio.

SUMMARY

The disclosure is direct to an encoding method and a decoding method, so as to improve the robustness and the inaudibility of a watermark in an audio.

In this disclosure, an encoding method for embedding a watermark into an audio is provided. The encoding method includes: obtaining a text watermark and an original audio; converting the text watermark to an image watermark; converting the original audio from a time domain to a frequency domain to generate a pre-processed audio; embedding the image watermark into the pre-processed audio to generate an encoded audio; and converting the encoded audio from the frequency domain to the time domain to generate a watermarked audio.

In this disclosure, a decoding method for verifying a watermark in an audio is provided. The decoding method includes: obtaining a text watermark and a watermarked audio; converting the text watermark to an image watermark; converting the watermarked audio from a time domain to a frequency domain to generate a target audio; extracting an extracted image from the target audio; and comparing the extracted image with the image watermark to generate a verifying result.

Based on the above, according to the encoding method and the decoding method, the robustness and the inaudibility of a watermark in an audio are improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
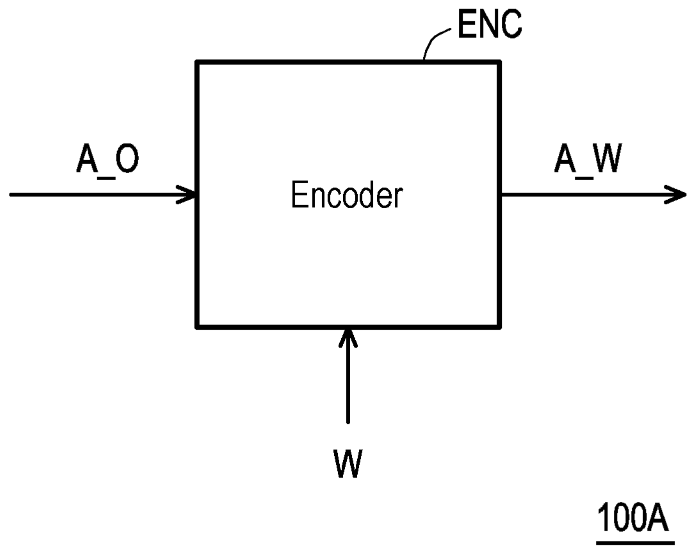
FIG. 1A is a schematic diagram of an encoding scenario according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

Intellectual property rights are very important issues in various fields. However, in the field of audio, it is relatively difficult to prove that a certain sound effect or a certain piece of an audio is created by someone or belongs to someone. In order to solve the above problems, the digital watermark hidden in the audio can be used as evidence to find out the creator or the owner of the certain sound effect or the certain piece of the audio.

While a watermark is not properly embedded into an audio, the audio might sound noisy due to the inconsistency between the watermark the audio. Besides, after the audio is compressed, the watermark may be damaged, thereby making the watermark unrecognizable. That is, how to develop an inaudible and robust watermark in an audio is becoming an issue to work on.

Figure 1B:
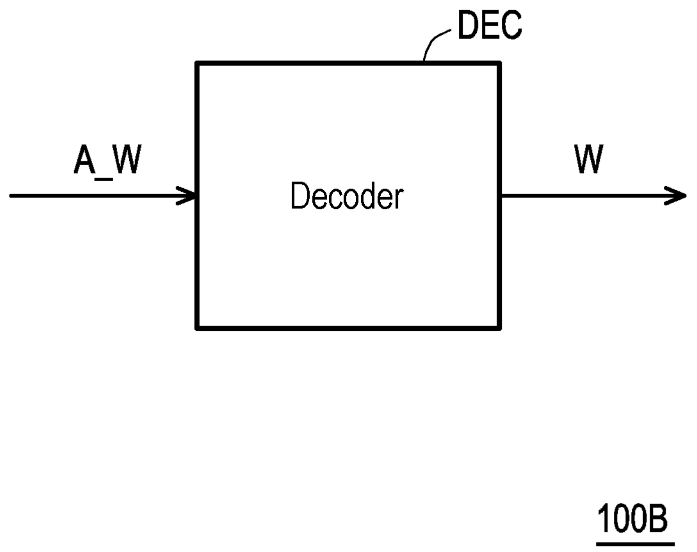
FIG. 1B is a schematic diagram of a decoding scenario according to an embodiment of the disclosure.

FIG. 1A is a schematic diagram of an encoding scenario according to an embodiment of the disclosure. FIG. 1B is a schematic diagram of a decoding scenario according to an embodiment of the disclosure. Referring to FIG. 1A and FIG. 1B, an encoding scenario 100A depicts how a watermark W may be embedded into an original audio A_O and a decoding scenario 100B depicts how the watermark W may be extracted from a watermarked audio A_W.

In the encoding scenario 100A of FIG. 1A, an encoder ENC may be utilized to embedding the watermark W into the original audio A_O. After the original audio A_O is watermarked, the watermarked audio A_W may be generated.

In one embodiment, the watermark W may include, for example, an identification number of the original audio A_O, an identification number of a user, a trademark, a name of an artist, a name of a creator, a name of an owner, or other recognizable information. However, this disclosure is not limited thereto. That is, the watermarked audio A_W may carry information for recognizing a creator or an owner of the original audio A_O.

In the decoding scenario 100B of FIG. 1B, a decoder DEC may be utilized to extract the watermark W from the watermarked audio A_W. Based on the watermark W extracted from the watermarked audio A_W, a creator or an owner of the original audio A_O may be found out.

In one embodiment, the encoder ENC and/or the decoder DEC may be achieved as multiple program codes. The program codes are stored in a memory, and executed by a controller or a processor. Alternatively, in an embodiment, each of the functions of the encoder ENC and/or the decoder DEC may be achieved as one or more circuits. The disclosure does not limit the use of software or hardware to achieve the functions of the encoder ENC and/or the decoder DEC.

In this manner, a digital watermark may be able to be hidden in an audio, which helps to find out the creator or the owner of the audio.

Figure 2:
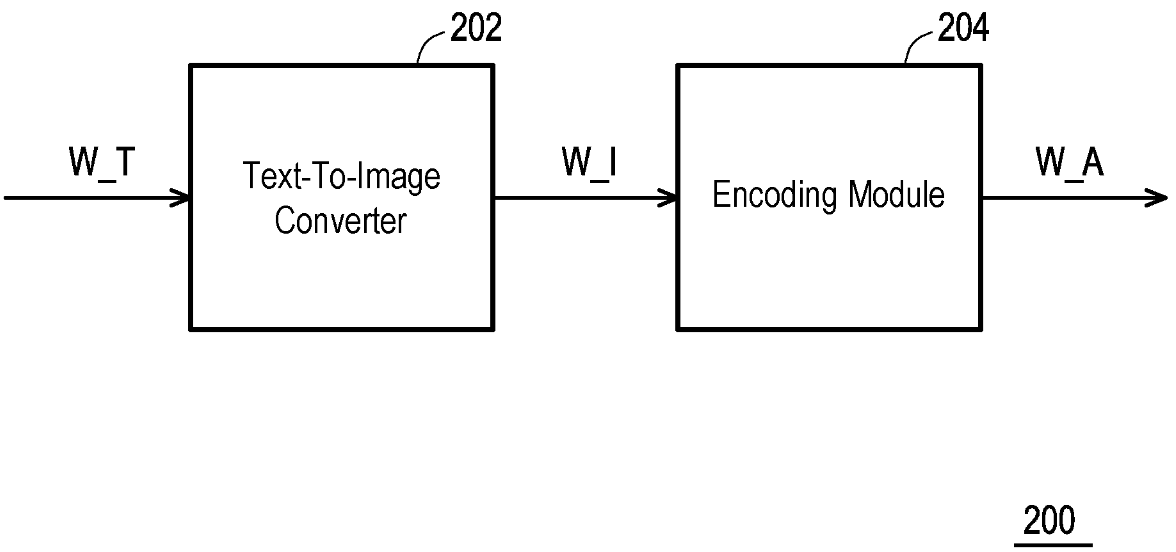
FIG. 2 is a schematic diagram of an encoding scenario according to an embodiment of the disclosure.

FIG. 2 is a schematic diagram of an encoding scenario according to an embodiment of the disclosure. Referring to FIG. 1A to FIG. 2, an encoding scenario 200 depicts how a text watermark W_T may be embedded into an audio. The encoding scenario 200 may include a text-to-image converter 202 and an encoder 204.

In one embodiment, the text-to-image converter 202 may be configured to convert the text watermark W_T to an image watermark W_I. For example, a text-to-image database may be store in a memory of the text-to-image converter 202 and the text-to-image database may indicate a relationship between patterns corresponding to the letters A~Z and the number 0~9. However, this disclosure is not limited thereto. Therefore, the text watermark W_T may be converted from a text format to an image format (i.e., the image watermark W_I) based on the text-to-image database.

In one embodiment, the encoder 204 may be configured to convert the image watermark W_I to an audio watermark W_A. For example, the encoder 204 may be configured to convert a spatial distribution to a temporal distribution in a time domain or a frequency distribution in a frequency domain. Therefore, the image watermark W_T may be converted from an image format to an audio format (i.e., the audio watermark W_A).

In one embodiment, the text-to-image converter 202 and/or the encoder 204 may be achieved as multiple program codes. The program codes are stored in a memory, and executed by a controller or a processor. Alternatively, in an embodiment, each of the functions of the text-to-image converter 202 and/or the encoder 204 may be achieved as one or more circuits. The disclosure does not limit the use of software or hardware to achieve the functions of the text-to-image converter 202 and/or the encoder 204.

In this manner, a digital watermark in an audio, the text watermark W_T may be converted from the text format to the audio format (i.e., the audio watermark W_A). In this manner, the audio watermark W_A may be ready to be embedded in the audio.

Figure 3:
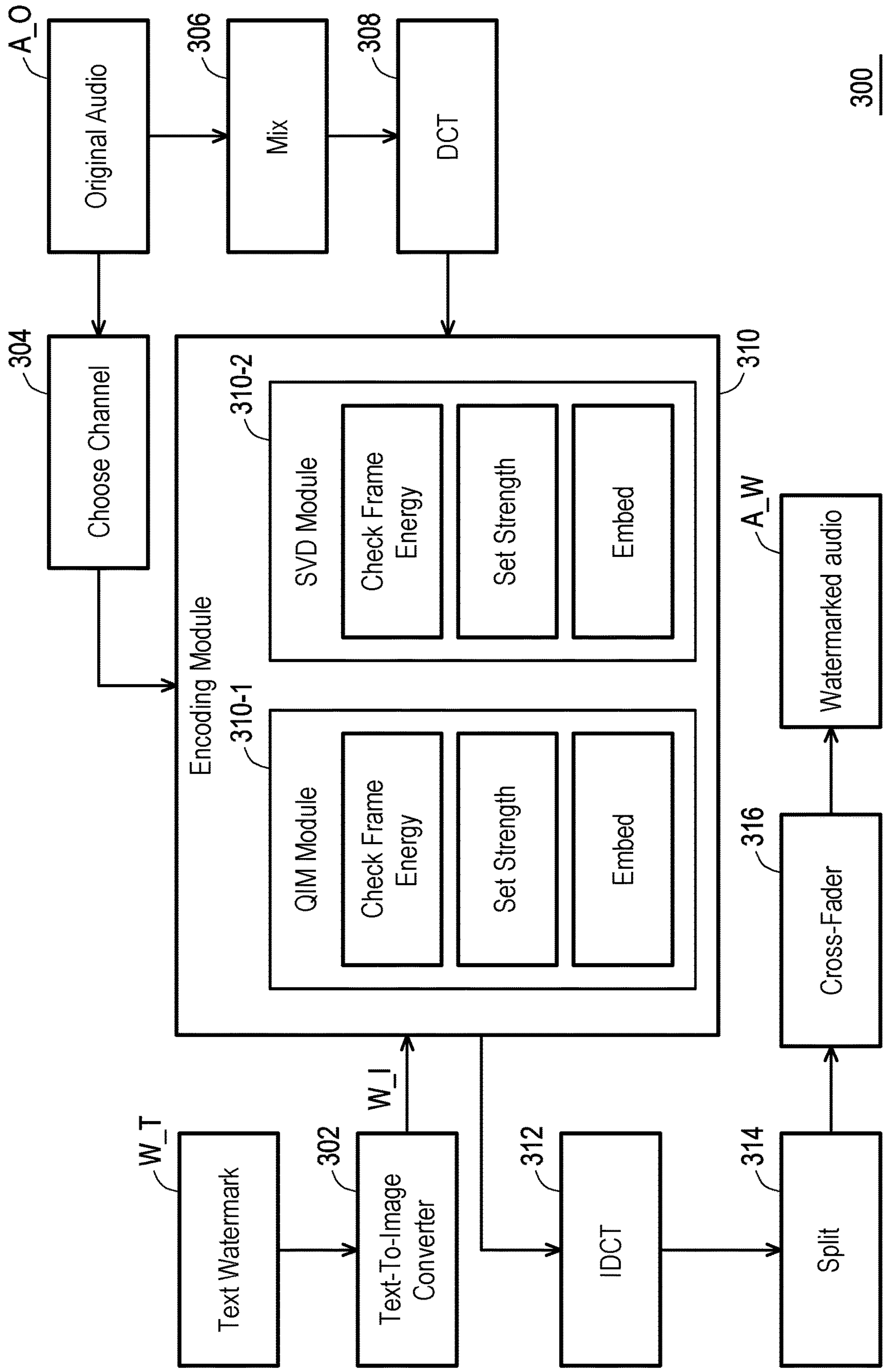
FIG. 3 is a schematic flowchart of an encoding scenario according to an embodiment of the disclosure.

FIG. 3 is a schematic flowchart of an encoding scenario according to an embodiment of the disclosure. Referring to FIG. 1A to FIG. 3, an encoding scenario 300 depicts how a digital watermark may be embedded into an audio. The encoding scenario 300 may include a plurality of modules to perform different functions of the encoding. While it is depicted and described for the sake of convenience in explanation that the functions of the encoding scenario 300 are perform by different modules, it is to be noted that the functions of the encoding scenario 300 may be performed by a single module. That is, the plurality of modules in the encoding scenario 300 may be integrated together as a single module.

In one embodiment, the plurality of modules or the single module may be achieved as multiple program codes. The program codes are stored in a memory, and executed by a controller or a processor. Alternatively, in an embodiment, each of the functions of the plurality of modules or the single module may be achieved as one or more circuits. The disclosure does not limit the use of software or hardware to achieve the functions of the plurality of modules or the single module.

First of all, the text watermark W_T and the original audio A_O may be obtained. For example, the text watermark W_T and the original audio A_O may be provided by a user. The user may be the creator or the owner of the original audio A_O, but this disclosure is not limited thereto.

The text watermark W_T may be converted to the image watermark W_I by a text-to-image converter 302. Further, image watermark W_I may be converted to the audio watermark W_A by an encoding module 310. The details of the text-to-image converter 302 and the encoding module 310 may be referred to the descriptions of the text-to-image converter 202 and the encoding module 204 in FIG. 2 respectively to obtain sufficient teachings, suggestions, and implementation embodiments, while the details are not redundantly described seriatim herein.

The original audio A_O may include a first channel and a second channel. For example, the original audio A_O may be a stereo audio and the first channel and the second channel may be a left channel and a right channel of the stereo audio, respectively. However, this disclosure is not limited thereto. A first channel energy of the first channel may be compared with a second channel energy of the second channel by a choose channel module 304. The choose channel module 304 may be configured to select a channel with a greater energy for embedding the audio watermark W_A. For example, in response to the first channel energy being greater than the second channel energy, the choose channel module 304 may be configured to determine the first channel for embedding the audio watermark W_A into the first channel to generate the watermarked audio A_W. On the other hand, in response to the first channel energy being not greater than the second channel energy, the choose channel module 304 may be configured to determine the second channel for embedding the audio watermark W_A into the second channel to generate the watermarked audio A_W.

In addition, the first channel and the second channel of the original audio A_O may include a plurality of first frames and a plurality of second frames, respectively. The first channel and the second channel of the original audio A_O may be mixed together by a mix module 306. Then, a mixed channel of the first channel and the second channel may be converted from a time domain to frequency domain by a discrete cosine transform (DCT) module 308 to generate a pre-processed audio. That is, the original audio A_O may be converted from the time domain to the frequency domain based on a DCT algorithm to generate the pre-processed audio. The pre-processed audio may be inputted into the encoding module 310 for embedding the audio watermark W_A into the pre-processed audio to generate an encoded audio.

In one embodiment, the encoding module 310 may be configured to detect a frame with a greatest energy for determining an encoding timing. For example, the encoding module 310 may be configured to detect a plurality of first frame energies of the plurality of first frames and a plurality of second frame energies of the plurality of second frames. Further, the encoding module 310 may be configured to determine a frame with a maximum energy among the plurality of first frames and plurality of second frames as a maximum energy frame. A timing of the maximum energy frame may be determined as the encoding timing. That is, the encoding timing may be determined according to the maximum energy frame. According to the encoding timing, the audio watermark W_A may be embedded into the pre-process audio. In other words, the audio watermark W_A may be embedded at a specific timing that the pre-process audio having a maximum energy, thereby increasing the inaudibility of the digital watermark due to a masking effect.

In one embodiment, assuming that the first channel is chosen by the choose channel module 304 for embedding the audio watermark W_A, while the maximum energy frame also belongs to the first channel, the encoding module 310 may be configured to embed the audio watermark W_A into the first channel at the encoding time according to the maximum energy frame.

It is noted that, while the maximum energy frame also belongs to the second channel, the encoding module 310 may be still configured to embed the audio watermark W_A into the first channel at the encoding time according to the maximum energy frame. That is, although the maximum energy may happen in the second channel, the audio watermark W_A may be still embedded in the first channel since the maximum energy of the second channel would mask the energy of the audio watermark W_A of the first channel.

After the audio watermark W_A being embedded into the pre-process audio, the encoded audio may be generated. An inverse discrete cosine transform (IDCT) module 312 may be configured to convert the encoded audio from the frequency domain back to the time domain to generate the watermarked audio A_W. That is, the encoded audio may be converted from the frequency domain to the time domain based on an IDCT algorithm to generate the watermarked audio A_W. Moreover, after the encoded audio being converted from the frequency domain to the time domain, the first channel and the second channel may be split by a split module 314 to generate the watermarked audio A_W. In addition, a cross-fader 316 may be configured to perform a smoothing process to decrease the impact of the audio watermark W_A while being heard. In this manner, the watermarked audio A_W may be generated, while the inaudibility of the audio watermark W_A may be increased.

It is noted that, the encoding module 310 may be configured to embed a digital watermark into an audio utilizing different algorithms. In one embodiment, the encoding module 310 may include a quantization index modulation (QIM) module 310-1 and a singular value decomposition (SVD) module 310-2, but this disclosure is not limited thereto.

The QIM module 310-1 may be configured to perform three steps for embedding the audio watermark W_A into the pre-processed audio. The three steps may include: checking frame energy, setting strength, and embedding. In the step of checking frame energy, the QIM module 310-1 may be configured to check a frame energy of each frame of the pre-processed audio. For example, while the first channel is chosen by the choose channel module 304 for embedding the audio watermark W_A, the QIM module 310-1 may be configured to check the frame energy of each frame of the first channel. In the step of setting strength, the QIM module 310-1 may be configured to determine an encoding energy of the audio watermark W_A (i.e., the image watermark W_I in the audio format) based on the frame energy. For example, the encoding energy may be smaller than the frame energy, thereby increasing the inaudibility of the digital watermark due to the masking effect. In the step of embedding, the QIM module 310-1 may be configured to embed the audio watermark W_A (i.e., the image watermark W_I in the audio format) into the pre-processed audio according to the encoding energy based on a QIM algorithm to generate the encoded audio.

Specifically, the QIM module 310-1 may be configured to quantize the pre-processed audio by rounding values of the pre-processed audio to a finite number of levels. Further, the QIM module 310-1 may be configured to associate each bit of the audio watermark W_A with a quantization level. For example, a first bit of the audio watermark W_A may be associated with a first quantization level, a second bit of the audio watermark W_A may be associated with a second quantization level, and so on. Furthermore, the QIM module 310-1 may be configured to modify the pre-processed audio according to the audio watermark W_A by changing a quantization level of each bit of the pre-processed audio based on a quantization level of each bit of the audio watermark W_A. In this manner, the audio watermark W_A may be embedded into the pre-processed audio based on the QIM algorithm to generate the encoded audio.

Similarly, the SVD module 310-2 may be configured to perform threes steps form embedding the audio watermark W_A into the pre-processed audio. The three steps may include: checking frame energy, setting strength, and embedding. The details of the step of checking frame energy and the step of setting strength may be referred to the descriptions of the QIM module 310-1 to obtain sufficient teachings, suggestions, and implementation embodiments, while the details are not redundantly described seriatim herein.

In the step of embedding, the SVD module 310-2 may be configured to embed the audio watermark W_A (i.e., the image watermark W_I in the audio format) into the pre-processed audio according to the encoding energy based on a SVD algorithm to generate the encoded audio.

Specifically, the SVD module 310-2 may be configured to perform a singular value decomposition to the pre-processed audio to obtain singular values of the pre-processed audio. For example, the singular value decomposition may be performed by transforming the pre-processed audio into three matrixes while one of the three matrixes with eigenvalues on the diagonal may be the eigenvalue matrix. Further, the SVD module 310-2 may be configured to associate each bit of the audio watermark W_A with a singular value. For example, a first bit of the audio watermark W_A may be associated with a first singular value, the second bit of the audio watermark W_A may be associated with a second singular value, and so on. Furthermore, the SVD module 310-2 may be configured to modify the pre-processed audio according to the audio watermark W_A by changing each eigenvalue of the pre-processed audio based on each singular value of each bit of the audio watermark W_A. In this manner, the audio watermark W_A may be embedded into the pre-processed audio based on the SVD algorithm to generate the encoded audio.

In one embodiment, the audio watermark W_A (i.e., the image watermark W_I in the audio format) may be configured to be embedded into a first frame of the pre-processed audio based on the QIM algorithm to generate a first embedded frame of the encoded audio and to be embedded into a second frame of the pre-processed audio based on the SVD algorithm to generate a second embedded frame of the encoded audio. That is, not only one algorithm is used to embed a digital watermark into an audio. Both of the QIM algorithm and the SVD algorithm are used to embed a digital watermark into an audio. In other words, the digital watermark is embedded in to the audio according to two different algorithms, thereby increasing the robustness of the digital watermark in the watermarked audio A_W.

In one embodiment, the encoding module 310 may be configured to embed the digital watermark into the pre-process audio based on the QIM algorithm and the SVD algorithm repetitively and alternatively. For example, a first frame of the pre-processed audio may be embedded with the digital watermark based on the QIM algorithm. Further, a second frame of the pre-processed audio, which is after the first frame, may be embedded with the digital watermark based on the SVD algorithm. Furthermore, a third frame of the pre-processed audio, which is after the second frame, may be embedded with the digital watermark based on the QIM algorithm. Moreover, a fourth frame of the pre-processed audio, which is after the third frame, may be embedded with the digital watermark based on the SVD algorithm. For the sake of convenience in explanation, the first frame, the third frame, and so on may be called or may belong to a plurality of first frames and the second frame, the fourth frame, and so one may be called or may belong to a plurality of second frames. That is, the audio watermark W_A (i.e., the image watermark W_I in the audio format) may be configured to be embedded into the plurality of first frames of the pre-processed audio based on the QIM algorithm to generate a plurality of first embedded frames of the encoded audio and to be embedded into the plurality of second frames of the pre-processed audio based on the SVD algorithm to generate a plurality of second embedded frames of the encoded audio. In this manner, the digital watermark in the watermarked audio A_W may be disposed repetitively and alternatively, thereby increasing the robustness of the watermarked audio A_W.

Figure 4:
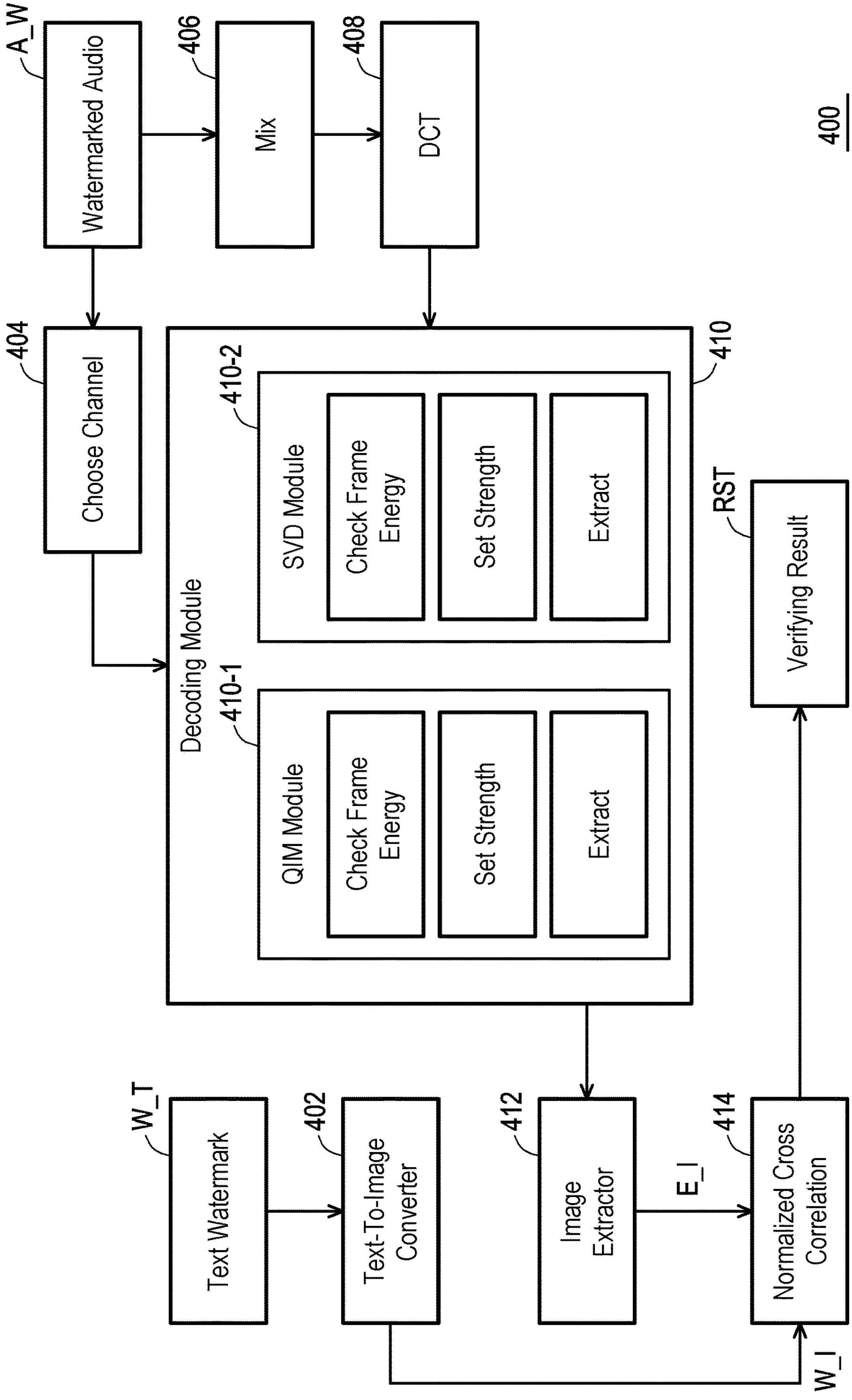
FIG. 4 is a schematic flowchart of a decoding scenario according to an embodiment of the disclosure.

FIG. 4 is a schematic flowchart of a decoding scenario according to an embodiment of the disclosure. Referring to FIG. 1A to FIG. 4, a decoding scenario 400 depicts how a digital watermark may be extracted from an audio. Similar to the encoding scenario 300, the decoding scenario 400 may include a plurality of modules to perform different functions of the decoding. While it is depicted and described for the sake of convenience in explanation that the functions of the decoding scenario 400 are perform by different modules, it is to be noted that the functions of the decoding scenario 400 may be performed by a single module. That is, the plurality of modules in the decoding scenario 400 may be integrated together as a single module.

First of all, the text watermark W_T and the watermarked audio A_W may be obtained. For example, the text watermark W_T and the watermarked audio A_W may be provided by a user. The user may be the creator or the owner of the original audio A_O, but this disclosure is not limited thereto.

The text watermark W_T may be converted to the image watermark W_I by a text-to-image converter 402. Further, image watermark W_I may be inputted to a normalized cross correlation module 414. The details of the text-to-image converter 402 may be referred to the descriptions of the text-to-image converter 202 in FIG. 2 respectively to obtain sufficient teachings, suggestions, and implementation embodiments, while the details are not redundantly described seriatim herein.

The watermarked audio A_W may include a first channel and a second channel. For example, the watermarked audio A_W may be a stereo audio and the first channel and the second channel may be a left channel and a right channel of the stereo audio, respectively. However, this disclosure is not limited thereto. A first channel energy of the first channel may be compared with a second channel energy of the second channel by a choose channel module 404. The choose channel module 404 may be configured to select a channel with a greater energy for extracting a target audio watermark. For example, in response to a first channel energy being of a first channel of the watermarked audio A_W greater than a second channel energy of a second channel of the watermarked audio A_W, the choose channel module 304 may be configured to determine the first channel for extracting the target audio watermark from the watermarked audio A_W. On the other hand, in response to the first channel energy being not greater than the second channel energy, the choose channel module 404 may be configured to determine the second channel for extracting the target audio watermark from the watermarked audio A_W. For example, the channel not chosen may a silent channel or a relatively quiet channel.

In addition, the first channel and the second channel of the watermarked audio A_W may include a plurality of first frames and a plurality of second frames, respectively. The first channel and the second channel of the watermarked audio A_W may be mixed together by a mix module 406. Then, a mixed channel of the first channel and the second channel may be converted from a time domain to frequency domain by a discrete cosine transform (DCT) module 408 to generate a target audio. That is, the watermarked audio A_W may be converted from the time domain to the frequency domain based on a DCT algorithm to generate the target audio. The target audio may be inputted into the decoding module 410 for extracting the target audio watermark from the watermarked audio A_W.

In one embodiment, the decoding module 410 may be configured to detect a frame with a greatest energy for determining a decoding timing. For example, the decoding module 410 may be configured to detect a plurality of first frame energies of the plurality of first frames and a plurality of second frame energies of the plurality of second frames. Further, the decoding module 410 may be configured to determine a frame with a maximum energy among the plurality of first frames and plurality of second frames as a maximum energy frame. A timing of the maximum energy frame may be determined as the decoding timing. That is, the decoding timing may be determined according to the maximum energy frame. According to the decoding timing, the target audio watermark may be extracted from the target audio. In other words, the target audio watermark may be extracted at a specific timing that the target audio having a maximum energy, since the audio watermark W_A was designed to be embedded utilizing the masking effect.

In one embodiment, assuming that the first channel is chosen by the choose channel module 404 for extracting the target audio watermark, while the maximum energy frame also belongs to the first channel, the decoding module 410 may be configured to extract the target audio watermark from the first channel at the decoding time according to the maximum energy frame. In another embodiment, assuming that the first channel is chosen by the choose channel module 404 for extracting the target audio watermark, the decoding module 410 may be configured to extract the target audio watermark from a mixed channel of the first channel and the second channel mixed by the mix module 406. That is, the decoding module 410 may extract target audio watermark from the mixed channel instead the first channel. However, this disclosure is not limited thereto.

It is noted that, while the maximum energy frame also belongs to the second channel, the decoding module 410 may be still configured to extract the target audio watermark from the first channel at the decoding time according to the maximum energy frame. That is, although the maximum energy may happen in the second channel, the audio watermark W_A may be still embedded in the first channel since the maximum energy of the second channel would mask the energy of the audio watermark W_A of the first channel.

After the target audio watermark being extracted from the target audio, a decoded audio may be generated. An image extractor 412 may be configured to extract an extracted image E_I from the target audio watermark by converting the target audio watermark from an audio format to an image format.

The normalized cross correlation module 414 may be configured to compare the extracted image E_I with the image watermark W_I to determine a similarity between the extracted image E_I and the image watermark W_I. Based on the similarity, the normalized cross correlation module 414 may be configured to output a verifying result RST. For example, in response to the similarity being greater than a predetermined threshold value, the verifying result RST may indicate that the extracted image E_I is similar as the image watermark W_I. On the other hand, in response to the similarity being not greater than the predetermined threshold value, the verifying result RST may indicate that the extracted image E_I is not similar as the image watermark W_I. In this manner, an unauthorized distribution of an audio may be found out, thereby improving the protection of the intellectual property right of an audio.

It is noted that, the decoding module 410 may be configured to extract the digital watermark from the audio utilizing different algorithms. In one embodiment, the encoding module 410 may include a quantization index modulation (QIM) module 410-1 and a singular value decomposition (SVD) module 410-2, but this disclosure is not limited thereto. For example, the QIM module 410-1 may be configured to extract the extracted image E_I from a first frame of the target audio based on a quantization index modulation algorithm to generate a first extracted image. Further, the SVD module 410-2 may be configured to extract the extracted image E_I from a second frame of the target audio based on a quantization index modulation algorithm to generate a second extracted image.

Similar as the encoding module 310, both of the QIM module 410-1 and the SVD module 410-2 may be respectively configured to perform threes steps form extracting the target audio watermark form the target audio. The three steps may include: checking frame energy, setting strength, and extracting. The details of the step of checking frame energy and the step of setting strength may be referred to the descriptions of the QIM module 310-1 to obtain sufficient teachings, suggestions, and implementation embodiments, while the details are not redundantly described seriatim herein. After the step of setting strength, a decoding energy may be determined according to the target audio.

In the step of extracting, encoding module 410 (e.g., the QIM module 410-1 or the SVD module 410-2) may be configured to extract the target audio watermark (i.e., the extract image E_I in the audio format) from the target audio according to the decoding energy based on the QIM algorithm or the SVD algorithm to generate the decoded audio. In this manner, the target audio watermark may be extracted.

Figure 5:
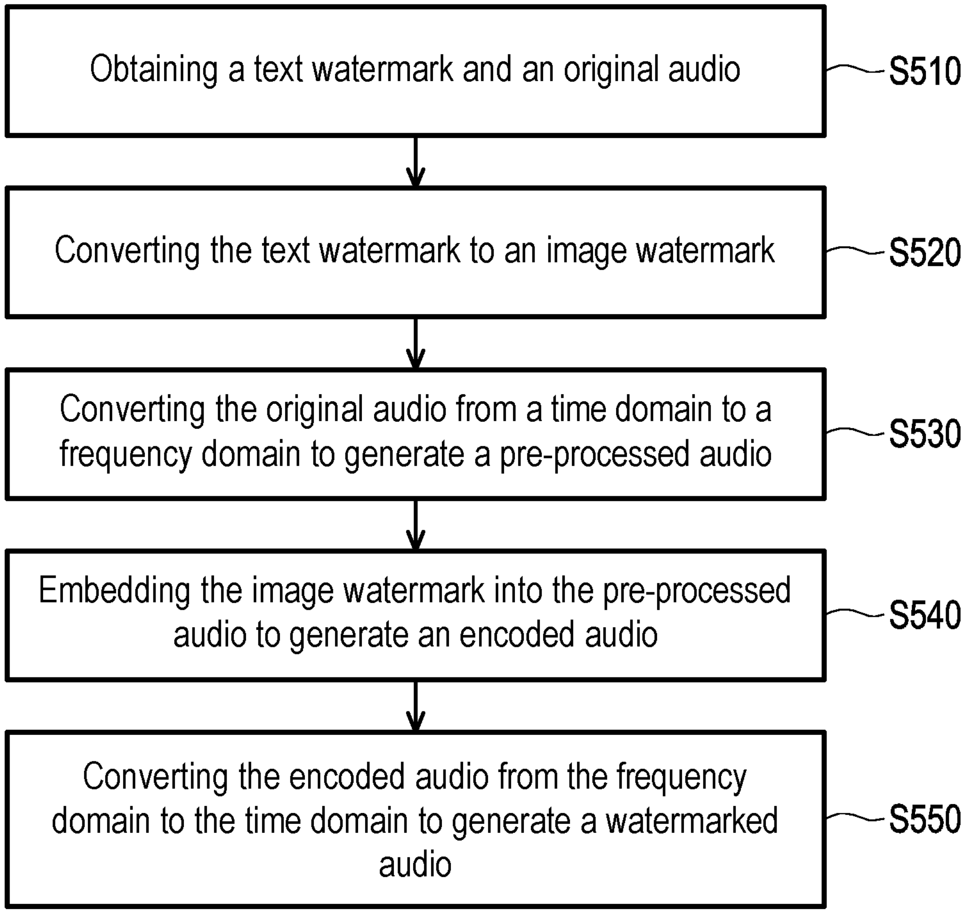
FIG. 5 is a schematic flowchart of an encoding method according to an embodiment of the disclosure.

FIG. 5 is a schematic flowchart of an encoding method according to an embodiment of the disclosure. An encoding method for embedding a watermark into an audio may include a step S510, a step S520, a step S530, a step S540, and a step S540.

In the step 510, the text watermark W_T and the original audio A_O may be obtained. In the step 520, the text watermark W_T maybe be converted to the image watermark W_I. In the step 530, the original audio A_O may be converted from a time domain to a frequency domain to generate the pre-process audio. In the step 540, the image watermark W_I may be embedded into the pre-processed audio to generate the encoded audio. In the step 550, the encoded audio may be converted from the frequency domain to the time domain to generate the watermarked audio A_W.

In addition, the implementation details of the encoding method may be referred to the descriptions of FIG. 1A to FIG. 3 to obtain sufficient teachings, suggestions, and implementation embodiments, while the details are not redundantly described seriatim herein.

In this manner, a digital watermark may be able to be hidden in an audio, which helps to find out the creator or the owner of the audio.

Figure 6:
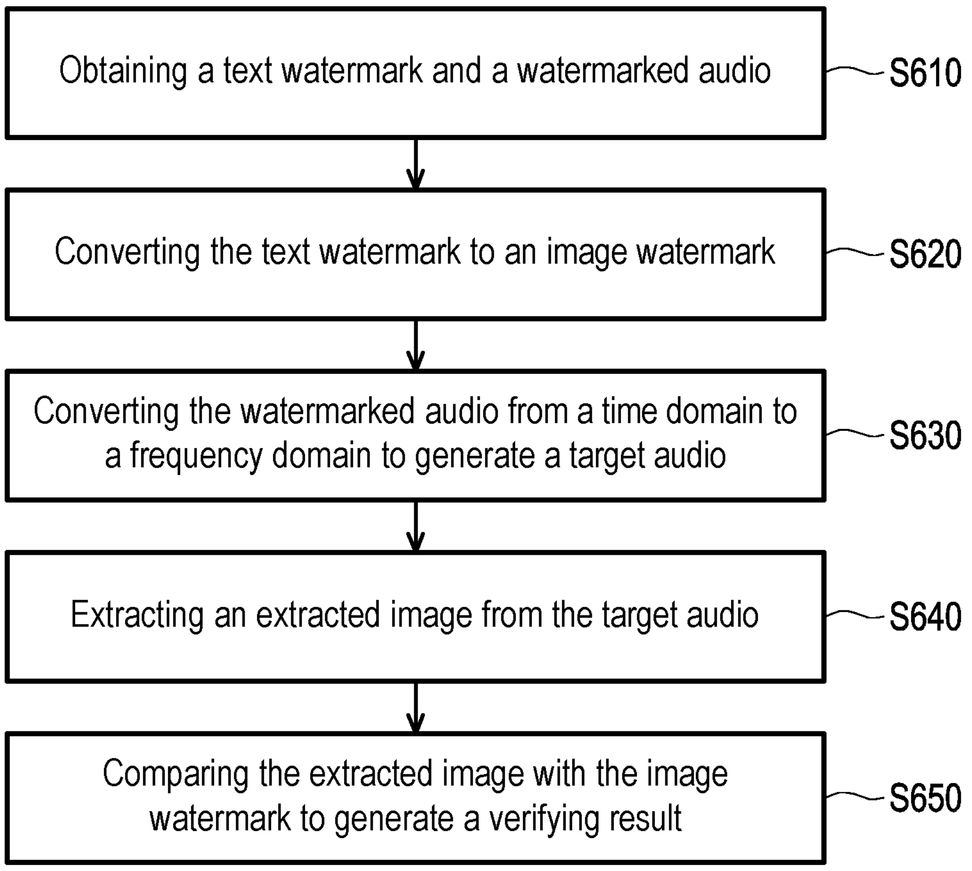
FIG. 6 is a schematic flowchart of a decoding method according to an embodiment of the disclosure.

FIG. 6 is a schematic flowchart of a decoding method according to an embodiment of the disclosure. A decoding method for verifying a watermark in an audio may include a step S610, a step S620, a step S630, a step S640, and a step S640.

In the step S610, the text watermark W_T and the original audio A_O may be obtained. In the step S620, the text watermark W_T may be converted to the image watermark W_I. In the step S630, the watermarked audio may be converted from a time domain to a frequency domain to generate a target audio. In the step S640, the extracted image E_I may be extracted from the target audio. In the step S650, the extracted E_I may be compared with the image watermark W_I to generate the verifying result RST.

In addition, the implementation details of the decoding method may be referred to the descriptions of FIG. 1A to FIG. 4 to obtain sufficient teachings, suggestions, and implementation embodiments, while the details are not redundantly described seriatim herein.

In this manner, an unauthorized distribution of an audio may be found out, thereby improving the protection of the intellectual property right of an audio.

In summary, according to the encoding method and the decoding method, a digital watermark may be able to be hidden in an audio, which helps to find out the creator or the owner of the audio. Further, the digital watermark may be embedded according to the energy of the audio, thereby increasing the inaudibility of the digital watermark due to the masking effect. Furthermore, the digital watermark may be embedded utilizing different algorithms in the audio, thereby increasing the robustness of the digital watermark in the audio.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An encoding method for embedding a watermark into an audio, comprising:

obtaining a text watermark and an original audio, wherein the original audio comprises a first channel and a second channel;

converting the text watermark to an image watermark;

converting the original audio from a time domain to a frequency domain to generate a pre-processed audio;

comparing a first channel energy of the first channel and a second channel energy of the second channel;

embedding the image watermark into the pre-processed audio to generate an encoded audio;

in response to the first channel energy being greater than the second channel energy, embedding the image watermark into the first channel to generate the encoded audio;

in response to the first channel energy not being greater than the second channel energy, embedding the image watermark into the second channel to generate the encoded audio; and converting the encoded audio from the frequency domain to the time domain to generate a watermarked audio.

2. The encoding method according to claim 1, further comprising:

converting the text watermark to the image watermark based on a text-to-image database.

3. The encoding method according to claim 1, further comprising:

converting the original audio from a time domain to a frequency domain based on a discrete cosine transform algorithm to generate the pre-processed audio; and converting the encoded audio from the frequency domain to the time domain based on an inverse discrete cosine transform algorithm to generate the watermarked audio.

4. The encoding method according to claim 1, further comprising:

checking a frame energy of each frame of the pre-processed audio;

determining an encoding energy of the image watermark based on the frame energy; and embedding the image watermark into the pre-processed audio according to the encoding energy to generate the encoded audio.

5. The encoding method according to claim 1, further comprising:

embedding the image watermark into the pre-processed audio based on a quantization index modulation algorithm to generate the encoded audio.

6. The encoding method according to claim 1, further comprising:

embedding the image watermark into the pre-processed audio based on a singular value decomposition algorithm to generate the encoded audio.

7. The encoding method according to claim 1, further comprising:

embedding the image watermark into a first frame of the pre-processed audio based on a quantization index modulation algorithm to generate a first embedded frame of the encoded audio; and embedding the image watermark into a second frame of the pre-processed audio based on a singular value decomposition algorithm to generate a second embedded frame of the encoded audio.

8. The encoding method according to claim 1, further comprising:

embedding the image watermark into a plurality of first frames of the pre-processed audio based on a quantization index modulation algorithm to generate a plurality of first embedded frames of the encoded audio; and embedding the image watermark into a plurality of second frames of the pre-processed audio based on a singular value decomposition algorithm to generate a plurality of second embedded frames of the encoded audio, wherein the plurality of first frames and the plurality of second frames are disposed alternatively in the pre-processed audio.

9. The encoding method according to claim 1, wherein the first channel comprises a plurality of first frames and the second channel comprises a plurality of second frames, and the encoding method further comprises:

mixing the first channel and the second channel to generate the pre-processed audio;

detecting a plurality of first frame energies of the plurality of first frames and a plurality of second frame energies of the plurality of second frames;

determining a maximum energy frame with a maximum energy among the plurality of first frames and plurality of second frames;

determining an encoding timing according to a timing of the maximum energy frame;

embedding the image watermark into the pre-processed audio according to the encoding timing to generate the encoded audio; and after converting the encoded audio from the frequency domain to the time domain, splitting the first channel and the second channel to generate the watermarked audio.

10. A decoding method for verifying a watermark in an audio, comprising:

obtaining a text watermark and a watermarked audio, wherein the watermarked audio comprises a first channel and a second channel;

converting the text watermark to an image watermark;

converting the watermarked audio from a time domain to a frequency domain to generate a target audio;

comparing a first channel energy of the first channel and a second channel energy of the second channel;

extracting an extracted image from the target audio;

in response to the first channel energy being greater than the second channel energy, extracting the extracted image from the first channel; and in response to the first channel energy not being greater than the second channel energy, extracting the extracted image into the second channel; and comparing the extracted image with the image watermark to generate a verifying result.

11. The decoding method according to claim 10, further comprising:

converting the text watermark to the image watermark based on a text-to-image database.

12. The decoding method according to claim 10, further comprising:

converting the watermarked audio from a time domain to a frequency domain based on a discrete cosine transform algorithm to generate the target audio.

13. The decoding method according to claim 10, further comprising:

checking a frame energy of each frame of the target audio;

determining a decoding energy of the extracted image based on the frame energy; and extracting the extracted image from target audio according to the decoding energy.

14. The decoding method according to claim 10, further comprising:

extracting the extracted image from the target audio based on a quantization index modulation algorithm.

15. The decoding method according to claim 10, further comprising:

extracting the extracted image from the target audio based on a singular value decomposition algorithm.

16. The decoding method according to claim 10, further comprising:

extracting the extracted image from a first frame of the target audio based on a quantization index modulation algorithm to generate a first extracted image;

extracting the extracted image from a second frame of the target audio based on a quantization index modulation algorithm to generate a second extracted image.

17. The decoding method according to claim 10, further comprising:

determining a similarity between the extracted image and the image watermark; and outputting the verifying result based on the similarity.

18. The decoding method according to claim 10, wherein the first channel comprises a plurality of first frames and the second channel comprises a plurality of second frames, and the decoding method further comprises:

mixing the first channel and the second channel to generate the pre-processed audio;

detecting a plurality of first frame energies of the plurality of first frames and a plurality of second frame energies of the plurality of second frames;

determining a maximum energy frame with a maximum energy among the plurality of first frames and plurality of second frames;

determining a decoding timing according to a timing of the maximum energy frame;

extracting the extracted image from the target according to the decoding timing.

* * * * *